United States Patent [19]

Meyer et al.

[11] 4,163,804
[45] Aug. 7, 1979

[54] THERMOPLASTIC COMPOSITION DERIVED FROM ANIMAL PARTS AND METHODS FOR PRODUCTION THEREOF

[75] Inventors: Robert H. Meyer; Charles I. Graham; John E. Rudolph; Robert E. Haas, all of Lima, Ohio

[73] Assignee: Beatrice Foods Co., Chicago, Ill.

[21] Appl. No.: 876,124

[22] Filed: Feb. 8, 1978

[51] Int. Cl.$^2$ .............................. A23L 1/31; A23J 3/00
[52] U.S. Cl. ..................................... 426/315; 426/417; 426/438; 426/445; 426/513; 426/641
[58] Field of Search ............... 426/513, 516, 315, 646, 426/645, 641, 445, 438, 441, 473, 472, 104, 417

[56] References Cited

U.S. PATENT DOCUMENTS

| | | | |
|---|---|---|---|
| 2,345,463 | 3/1944 | Cox | 426/645 |
| 2,562,850 | 7/1951 | Winslow | 426/417 |
| 2,855,309 | 10/1958 | Andersen et al. | 426/641 |
| 2,907,660 | 10/1959 | O'Brian et al. | 426/438 |
| 3,291,616 | 12/1966 | Brissey | 426/646 X |
| 3,401,045 | 9/1968 | Halpern | 426/641 X |
| 3,447,929 | 6/1969 | Hale | 426/513 X |
| 3,922,377 | 11/1975 | Whittle | 426/646 X |
| 4,068,008 | 1/1978 | Orchard | 426/513 X |

Primary Examiner—Kenneth M. Schor
Attorney, Agent, or Firm—Murray and Whisenhunt

[57] ABSTRACT

A puffable, thermoplastic composition derived from animal parts is prepared by drying substantially raw animal parts to a moisture content between 10% and 25%, comminuting those parts and mechanically defatting the comminuted particles to a fat content of less than 18%. The defatted particles are macerated in an extruder at temperatures less than 330° F. and under sufficient pressure to cause gelatinization of the particles. The resulting thermoplastic moldable mass is extruded to a shape sustaining form and cooled to below 215° F., after which it is cut into puffable pellets. The pellets will be at least partially gelatinized animal parts, have a moisture content of less than 15%, a fat content of less than 15% and the protein thereof will not be subjected to denaturing temperatures in excess of 330° F. The pellets may be puffed in hot oil to a product which resembles fried port skins or they may be thermo-formed into a decorative shape, e.g., in the shape of a chewable dog bone.

25 Claims, 1 Drawing Figure

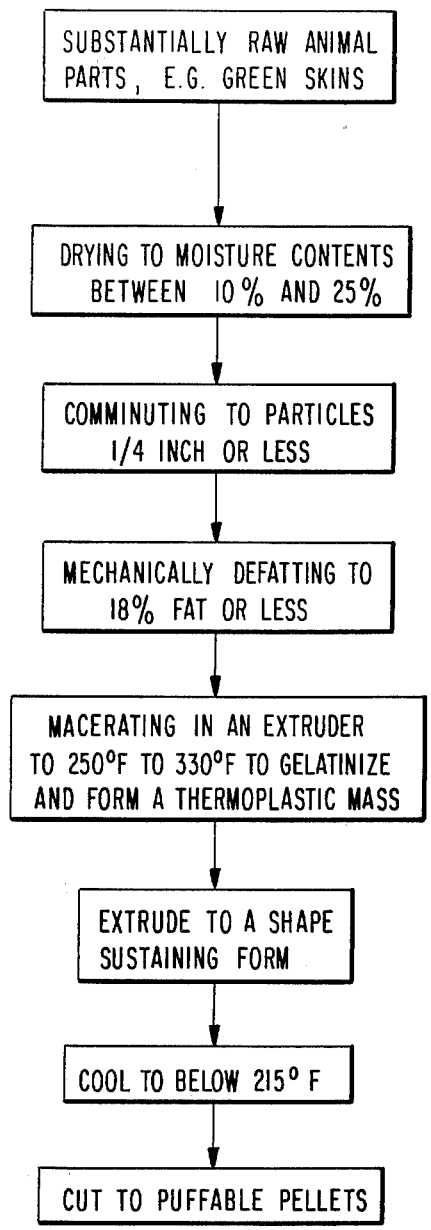

THERMOPLASTIC COMPOSITION DERIVED FROM ANIMAL PARTS AND METHODS FOR PRODUCTION THEREOF

The present invention relates to a puffable thermoplastic composition derived from animal parts and to methods for production thereof. More particularly, the invention relates to such compositions which are produced from substantially raw animal parts, e.g., non-rendered animal parts. Even more particularly, the invention relates to such composition and methods where the final products may closely resemble either conventional fried pork skins or be in a decorative shape, e.g., a chewable dog bone.

BACKGROUND OF THE INVENTION

Puffed fried pork skins have been a popular snack food for many years. These are prepared by cutting raw pork skins into pellets, rendering the pellets and deep-fat frying the pellets at high temperatures until the pellets are puffed. The process suffers from several problems. It produces substantial quantities of small pieces of rendered pellets (called fines, balls and tails) which cannot be puffed into acceptable products and is therefore wasteful of the starting material. The rendering step is time-consuming, which substantially increases the cost of the product. The pellets, and correspondingly puffed product are the varying sizes and shapes, due to the difficulty in accurately cutting the rubbery raw (green) pork skins. This causes substantial difficulty in packaging the product in conventional film packages both in terms of processing and avoiding underweight packages. Further, since the varying sizes and shapes are puffed at the same temperature and for the same time (for practical manufacturing process), some of the odd sizes and shapes may incompletely puff and produce hard centers.

The art has sought to obviate one or more of these problems. For example, U.S. Pat. No. 2,547,747 proposes to use bacon rinds instead of green skins. The use of rinds, apparently, in the process avoids a separate rending step. The rinds are steam-cooked, ground, extruded into strips, cut in appropriate sizes and deep-fat fried or baked.

Somewhat similarly, U.S. Pat. No. 2,562,850 suggests that a high pressure steam cooking be carried out until bacon rinds are gelatinized. Thereafter, the gelatinized rinds are pressed to remove remaining fat, formed into sheets, cut, and deep-fat fried or baked.

In U.S. Pat. No. 2,947,635, the toughness often associated with some puffed pork skins is attributed to inadequate moisture removal in the frying step which results in the collapse of puffed cells in the fried skin. To avoid this difficulty, it is proposed that the frying include a differential pressure condition, e.g., the frying step is carried out in deep fat maintained in a vacuum system.

On the other hand, U.S. Pat. No. 2,907,660 teaches that the texture difficulties are due to varying moisture contents of the pork skins (including bacon rinds and green skins). The patent suggests heating the skins in hot oil until all visible vapor is removed and then further heating the skins in that oil under pressurized conditions of up to 20 psi. That intermediate product is said to be uniform in moisture content and will produce uniform puffed skins.

In U.S. Pat. No. 3,401,045, a process is described where raw (green) skins are cut and rendered in fat at higher temperatures for extended periods of time, i.e., until the green skins are cooked and are reduced in size to about one-half of the original size. These relatively hard, dry and tough pieces are then soaked in an aqueous flavoring solution, dried to a prescribed moisture content and puffed by deepfat frying.

A similar idea is stated in U.S. Pat. No. 3,428,462, which proposes low-rendering temperatures for initially cooking green skins, with increasing temperatures and the repeated addition of water to the heated fat vessel (the temperature of which must be very low) until the green skins are fully cooked. The cooked skins are puffed at higher temperatures in the latter portions of the process. This is said to supply the necessary moisture for the skins and avoid the difficulty of hard and impalatable product.

In copending application Ser. No. 734,967, filed on Oct. 22, 1976 and now U.S. Pat. No. 4,119,742, there is disclosed a process wherein certain of the above-noted problems are obviated in that the process uses a starting material which is particles of animal parts which are sufficiently high in collagen content to cause gelatinization thereof and at least 50% by weight thereof are rendered parts. In a particular form of the process, the "balls, tails and fines" (identified above) are used as the starting material. These particles are moisturized and gelatinized in a screw-type extruder having thermally controlled barrel sections to produce an extrudate which is smooth, glossy, and does not exhibit reversion characteristics (will not revert to an agglomeration of particulate material at room temperature). That extrudate is cooled, cut, dried, and deep-fat fried to produce a puffed product which closely resembles a conventional fried pork skin in taste, appearance, texture and mouth-feel. This process provides a substantial advance in the art, particularly in that the sizes and shapes of the extruded and cut material are substantially uniform and a uniform puffing can be achieved. This avoids difficulties in packaging and in regard to hard centers of the packaged product. Additionally, it recovers the otherwise waste "balls, tails, and fines" which accumulate in the rendering tanks.

The process of that copending application, however, does require rendered starting material (at least 50% of the animal parts must be rendered) and, thus, does suffer from the disadvantage noted above in connection with the rendering step. Accordingly, it would be of distinct advantage in the art if the rendering step, conventionally practiced in the art, could be avoided, while on the other hand achieving the advantages of the process described in the said copending application.

OBJECTS OF THE INVENTION

It is therefore an object of the invention to provide a process for producing puffable compositions derived from animal parts wherein the conventional rendering step is avoided, along with the attendant disadvantages thereof. It is a further object of the invention to provide a process which may utilize a wide range of animal parts, thus, not restricting the process to pork skins and the varying availability thereof. It is yet a further object of the invention to provide a process wherein the compositions produced therefrom may be used for producing products other than those resembling fried pork skins. Finally, it is an object of the invention to provide a process which can be carried out with increased mechanization and which eliminates some of the manual aspects and inspections required for the conventional process for producing puffed pork skins. It is an object to provide compositions consistent with the method of the invention.

BRIEF DESCRIPTION OF THE INVENTION

Thus, there is provided a method for producing a puffable, thermoplastic composition derived from animal parts comprising drying substantially raw animal parts to moisture contents between 10% and 25%, comminuting the dried parts to particles having dimensions no greater than one-quarter inch, mechanically defatting the comminuted particles to an average fat content of less than 18%, mascerating the defatted particles in an extruder at temperatures between 250° F. and 325° F. and under sufficient pressure to cause gelatinization of the particles and to form a thermoplastic moldable mass, extruding the moldable mass into a shape-sustaining extruded form, cooling the extruded form to below 215° F., and cutting the cooled form into puffable pellets. The so produced pellet may then be puffed in hot oil to at least twice the unpuffed volume of the pellets. Alternatively, the pellets may be thermoformed into a decorative shape, e.g., a chewable dog bone.

There is also provided a puffable thermoplastic composition comprising a shape-sustaining form of at least partially gelatinized particles of animal parts, the moisture content thereof being less than 15%, the fat content thereof being less than 15%, and the protein being substantially undenatured, i.e., not subjected to temperatures above 325° F.

BRIEF DESCRIPTION OF THE DRAWINGS

The drawing shows in block form the major steps of the process.

DETAILED DESCRIPTION OF THE INVENTION

The invention is based on several important discoveries. Firstly, it was discovered that by certain processing many of the advantages described in the above-identified copending application could be retained even when the starting material did not contain higher percentages of previously rendered animal parts, e.g., "balls, tails and fines".

A concurrent discovery which allows the use of the non-rendered starting material is that the fat content of the starting material must be reduced by mechanical means as opposed to conventional hot oil rendering. It was found, in this regard, that when hot oil rendering is commenced, substantial changes quickly take place in the starting material and these changes ultimately require a significantly lower fat content of the particles for successful extrusion than that which is acceptable for successful extrusion of hot oil rendering has not substantially occurred. Apparently, the hot oil rendering rather quickly causes undesired denaturization of the starting material with the attendant necessity of lower fat content for successful extrusion of that at least partially denatured material.

A third important discovery is that the extrusion of particles which have not been substantially denatured allows gelatinization thereof at relatively low temperatures, which will provide a thermoplastic mass. This thermoplastic mass may be subsequently shaped into pellets for frying into simulated pork skins or it may be molded by conventional techniques into decorative and unpuffed shapes.

It is the understanding of these three discoveries which lead to the processes and products of the present invention. With these processes many of the difficulties discussed above in connection with prior processes are obviated. Thus, there is no need for accurately cutting the green skins into pellets in order to avoid difficulties with packaging and hard centers, since the skin will be comminuted prior to extrusion. The process is not limited to animal parts which have been previously rendered and the difficulties associated with conventional hot oil rendering tanks are avoided. Since the process produces uniform sizes, shapes, and puffing characteristics, the fried product will be uniform in size and shape and with no hard centers, which avoids packaging and texture problems.

Further, the process may use a wide variety of animal parts as the starting material and yet provide relatively uniform products. The process is, therefore, not narrowly dependent upon the supply of green skins, as are the prior art processes. It should be understood, however, that the process is not limited to the use of only green skins and certain amounts of pre-processed skins and animal parts may be used. Thus, in the present specification and claims the starting material is referred to as "substantially raw animal parts" and these terms are defined as animal parts which contain no more than 25% hot oil rendered parts. In this connection, the term "hot oil rendered" is the same as the conventional usage, i.e., where moisture and fat have been removed from the animal parts by subjecting the parts to oil at temperatures between 212° F. and 350° F. for at least one half hour, e.g., at least one hour.

Aside from the foregoing requirement, the animal parts may be chosen from a wide variety of high collagen content animal parts. It will be appreciated, as briefly noted above, that gelatinization must take place to produce the thermoplastic mass and to this end substantial amounts of undenatured collagen is required. Hence, the animal parts may be conventional green pork skins, in part rendered pork skins (as noted above), bacon or ham rinds, connective tissue, cartilage (such as derived from snouts, ears, hooves, etc.), and intestinal tract tissue. Other selected animal parts may be low in collagen and it is only necessary that the total mixture of animal parts have a relatively high average collagen content. The absolute collagen content may vary considerably, depending on the specific source of the animal part, so long as the content is sufficiently high to cause gelatinization to the extent that a thermoplastic mass of the animal parts may be achieved, as explained hereinafter more fully.

Traditional "pork skins" are taken from pork bellies and backs, but, with the present process, any animal skin may be used, either bovine or non-bovine. Indeed, the starting material may contain fowl skin, e.g., chickens and turkeys, or beef skin or skin from parts of pigs other than the bellies and backs, e.g., the head skin, leg skin, and the like. It is, however, preferred that the process be carried out with traditional pork belly skin, i.e., green skins, rendered skins, bacon and ham rinds, with the above-noted limitations as to the rendered skins. More preferably, the starting material is conventional green skins, since these are the most readily available starting materials for most time periods and provide an excellent end product.

As opposed to the process of the above-identified copending application, the present starting material must be dried since the substantially raw animal parts will have a relatively high moisture content; the moisture must be reduced to a level consistent with further processing. The drying will be by other than hot oil drying, since apparently hot oil can rapidly cause denaturization of the protein in the starting material and disrupt the required gelatinization and formation of the thermoplastic mass. Accordingly, conventional air/smoke oven drying is preferred. In this conventional process the animal parts are simply tumbled in the oven dryer until sufficient moisture has been removed therefrom. If the animal parts are in the form of green skins it is desirable to cut the skins to smaller sizes for the convenience of drying, although this is not critical. Generally, sizes having dimensions no greater than about two to three inches, e.g., no greater than about one and one-half inches are preferred. If desired, prior to drying, the skins may be comminuted to a size consistent with the requirement for extruding, but this tends to complicate the process in that the smaller sizes are not readily amenable to conventional oven dryers and comminuting the green skins to these smaller sizes is more difficult, due to the rubbery nature of the green skins and like animal parts.

The moisture content during the drying operation is reduced to between 10% and 25%. This moisture content range is substantially greater than the suitable range in the above-identified copending application, since the present undenatured protein is amenable to much wider ranges of moisture content and this is a present advantage. However, for "screw" type extruders and "grinding" type extruders (more fully identified below), the preferred moisture ranges, respectively, are 18–24% and 12–15%.

The drying temperatures, preferably in air, smoke or the like, must not cause substantial denaturization of the protein. Thus, drying temperatures should not exceed 300° F. and temperatures between 212° F. and 275° F. are preferred. At temperatures beyond 300° F. undesirable amounts of protein denaturization can take place, especially with longer drying times.

If desired, conventional flavorings may be added during the drying step, i.e., the drying may be in combination with wood smoke which adds a smoked flavor. Conventional amounts of salt, pepper and other spices may also be added at this time.

The drying time is not critical so long as the drying temperatures and ultimate moisture contents noted above are observed. Ideally, however, the drying time will be less than five hours, e.g., about three hours or less, and will achieve a moisture content of the dried animal parts of between about 10% and 25%.

After appropriate drying, the animal parts are comminuted to a size consistent with ease of macerating in conventional extruders. For purposes of causing gelatinization and forming the thermoplastic mass, the particle size of the comminuted animal parts can be as great as one-quarter inch, although it is preferred that the particle be one-sixteenth inch or less, e.g., one-thirty-secondth inch or less.

While not necessary for extrusion purposes, when the ultimate product is intended for human consumption, it is preferred that the particles actually be ground by conventional means to very small particle size. This will ensure that any pieces of bone or like hard material associated with the animal parts will have been reduced to a particle size which will not cause difficulty in masticating the ultimate product. Any conventional grinding device is acceptable in this regard, but particularly useful are the rotary grinding devices such an Urschel Comitrol. These devices will reduce the particle size to less than one-sixty-fourth inch and therefore will avoid any difficulties with bone and the like in the final product.

Particularly when the dried material is to be ground, it is preferred that the dried material be cooled prior to comminuting. The warmer material tends to increase the greasing-out on comminuting and grinding devices. Therefore, in a preferred form of the invention, the dried material is cooled to below at least 150° F. prior to comminuting, especially to below 100° F. This cooling is, however, not critical.

As noted above, an important discovery of the present invention is that hot oil rendering causes such denaturization of the protein in the animal parts that the requirements for sufficient gelatinization in an extruder are more stringent than desired. Additionally, when substantially undenatured protein is used, according to the present process, the maceration in the extruder under the proper conditions will cause gelatinization to the point that a thermoplastic mass may be obtained. The advantages of the thermoplastic mass will be explained more fully hereinafter. On the other hand, animal parts must be reduced in fat content in order to accomplish sufficient gelatinization in the extruder. To achieve both of these purposes, therefore, it is necessary that the defatting step be by mechanical defatting, rather than by hot oil rendering and the like, at least within the limits noted above. While the mechanical defatting step may be by way of rollers, pressers, and the like, it has been discovered that a particular advantageous method of defatting is that of grinding the animal parts to a relatively small particle size, e.g., consistent with human consumption as noted above, and centrifuging the ground parts to remove fat. A conventional basket type centrifuge is quite acceptable for these purposes, although the ground animal parts must be contained within a conventional centrifuge bag, e.g., a Dacron centrifuge bag, in order that the ground parts will not be lost through the perforated basket of the centrifuge. Conveniently, a conventional Bock basket-type centrifuge is acceptable for this purpose. Indeed, any of the conventional centrifuges may be used so long as at least 300 g's, and preferably at least 500 g's, are generated on the ground particles in order to accomplish sufficient defatting thereof.

Irrespective of the particular mechanical defatting device used, it has been found that the fat content of the ground particles must be below 18% and more preferably below 15%. The theoretical explanation is not known, but the animal parts processed according to the present invention can be gelatinized to the greater extent required even with the fat content being as high as the 18% level, which is quite contrary to the process described in the above-identified copending application. In that process substantial amounts of rendered animal parts are required, i.e., at least 50% rendered parts. Thus, typically, the total fat content of the starting material of that process will be in the range of 7% to 9 or 10%. It has been discovered that once hot oil rendering commences to a substantial degree the denaturization of the protein proceeds so rapidly that the hot oil rendered animal parts have been reduced in the amount of undenatured protein to the point that adequate gelatinization in the extruder will not take place unless the fat content is reduced to the lower level of at least less than 10% and more usually at least less than 9% or even 8%.

In the present process, since substantial denaturization of the protein has not taken place the substantially higher amount of gelatinization can be achieved in the extruder without the necessity of reducing the fat content to that low level. This is a decided advantage of the present process, since it eliminates the need for hot oil rendering (required to reach such low fat levels) and therefore avoids the difficulties associated with hot oil rendering, as discussed above.

After the animal parts are mechanically defatted, an adjustment of the moisture content may or may not be necessary. Adequate extrusion will take place with moisture contents between 10% and 25%, although the preferred moisture contents for the screw or grinder-type extruders should be as noted above. If the moisture content is less than about 10%, moisturization may be achieved by simply adding water, preferably as a fine stream or mist, while agitating the defatted animal parts. That moisture will be absorbed into the parts, similar to the operation described in the above-identified copending application. Indeed, if desired, the moisture may be added prior to the defatting step, although this is not preferred, since some of that moisture will be lost during the mechanical defatting step and additional compensating moisture or further moisturization may be required.

As opposed to the invention in the said copending application, the present process is not limited to a screw-type extruder, although that type of extruder is quite acceptable for the present process. It is an important advantage of the present invention that the extruder may be of the "grinding"-type extruder. Screw-type extruders, of conventional design, are described in some detail in the said copending application and will not be repeated herein. However, briefly, those extruders have relatively long barrels with independently heated sections, e.g., heated by electrical heaters, oil heaters, steam heaters, water heaters, etc. The screw has different sections along its length for feed, grinding, compression, etc. According to the invention of the copending application, the throat section of the screw-type extruder must be retained relatively cool, as well as the die of the extruder, in order to avoid improper feeding into the extruder and undue surging and puffing at the die.

With the present process the more inexpensive and easy to operate low pressure "grinding"-type extruders may be used. Extruders of this nature are also well known and, generally, have high shear screw flights which masticate in essentially unheated or heated single section barrels of relatively short length. These extruders have, usually, relatively short screws of essentially uniform flights which function both to feed, masticate and pressurize. Extruders of this type are referred to as grinding extruders, since they function in a manner similar to conventional meat grinders. The grinding-type extruder provides greater latitude and ease of operation and is therefore a preferred form of the invention.

While not preferred, the extruder need not have any screw at all and may take the form of a heating vessel, e.g., an autoclave (preferably stirred), which generates sufficient heat and pressure to cause gelatinization, and having a suitable valved orifice to extrude the gelatinized mass into the desired shape.

Irrespective of the particular extruder used, the temperatures used in the extruder should be sufficiently high to cause gelatinization, i.e., above about 250° F., but below those temperatures which will cause substantial denaturization of the protein, i.e., temperatures no greater than about 325° F. This latter temperature, however, is not so narrowly critical in the grinding-type extruder, since the residence time therein is quite low and the amount of denaturization even at higher temperatures will be within acceptable limits. In that type of extruder temperatures up to as high as about 330° F. may be used, although it is preferred that the temperature remain below 300° F.

The extruder must sufficiently masticate the animal parts and cause sufficient pressure thereon that substantial gelatinization of the substantially undenatured protein takes place. With this high level of gelatinization, a product of unique properties is formed, i.e., the product exiting the extruder will be thermoplastic. Thus, if the product exiting the extruder can be molded by elevated temperatures and pressures, in the nature of a thermoplastic, then sufficient gelatinization has been achieved. If the product is not thermoplastic and hence moldable, then insufficient gelatinization took place. Insufficient gelatinization can occur by virtue of insufficient mastication during extrusion or by excessive denaturization during earlier processing or during excessive residence time in the extruder, although this latter source of denaturization occurs only in extreme cases of residence times. In any event, the correct product can be determined by virtue of a thermoplastic nature. The term "thermoplastic" in this regard means that the product may be extruded or molded to a shape substaining form at temperatures above 220° F. and pressures of at least 500 psig.

The product exiting the extruder may take a variety of shapes, including flat ribbons suitable for subsequent cutting to produce the pork skin snack food. Alternatively, other shapes may be prepared, e.g., annular shapes to ultimately produce a puffed ring snack food. When a flat ribbon shape is extruded through the extruder die to produce a puffed pork skin snack food, it is preferred that the extrudate be stretched by a ratio of at least 2:1 after the extrudate exits the die and preferably before the extrudate is cooled substantially below extrusion temperatures. This stretching tends to give a more uniform flat ribbon, both in terms of cross-sectional dimensions and in terms of product uniformity. Stretch ratios as great as 5:1 may be used, but more usually the stretch ratio will be approximately 2:1 to 3:1.

After extruding, the extrudate is cooled, preferably subsequent to stretching, in order that the extrudate may be cut. Cooling to temperatures below 215° F. will ensure sufficient setting of the thermoplastic mass that cutting with conventional knives, e.g., rotating discs and knives and the like, may be accomplished without undue smearing of the extrudate or accumulation of product on the knives. Preferably this temperature is below 160° F.

The cut pellets are preferably equilibrated, similar to the equilibration in the above-identified copending application and as explained below, by lagging (rest) at convenient temperatures and humidity so that the moisture content of the pellets will become uniform therethrough. This is particularly true if the cut pellets are subsequently dried to a lower moisture content prior to puffing. The optimum moisture content of the pellets for puffing is between 7 and 15%, especially between 9 and 12%. Moisture will be lost during the extruding step, but if higher moisture contents were used in the animal parts fed to the extruder, then a drying step of the cut pellets may not be required. Again, the drying is preferably by hot air oven drying at temperatures below 250° F. to 300° F., although since the thermoplastic mass has been formed hot oil drying at those temperatures may be used if desired.

As known, in any drying procedure, the normal transmission of moisture through the pellets will result in the inner portions of the pellets having a higher moisture content than the outer portion of the pellets. A non-uniformity of moisture within the pellet can result in non-uniform puffing during the frying step. To avoid this possibility, it is usually necessary to equilibrate the pellets, as noted above, prior to the frying step. The equilibration period can vary, depending upon the particular pellets and the moisture content, as well as the conditions of equilibration, but generally from 0.5 to 15 hours will be required and more usually between 4 and 12 hours. This time period can be shortened by carrying out the equilibration of elevated temperatures, which increases moisture migration within the pellets. Temperatures up to 150° F. to 175° F. are satisfactory. Also, if elevated temperatures are used, the pellets may be advantageously equilibrated by tumbling or other such agitation.

The pellets are then ready for frying in hot fat at 325° F. to 410° F. ("fat" is defined to include all edible animal and vegetable fats and oils that are liquid at the foregoing temperatures). Below 325° F., the frying time is excessive and uniform puffing may not result, while above 410° F. the puffing can be so rapid that non-uniform puffing may occur. More preferably, the temperature of the deep-fat frying will be between about 365° F., and 400° F., with an optimum temperature of about 400° F. With this temperature, the frying step may be accomplished in as little as about 15 seconds, although frying time up to 3 minutes or more may be used. Generally speaking, however, 30 seconds to 1½ minutes will be sufficient frying time with an optimum result at about 45 seconds. In any event, the frying step should reduce the moisture content of the puffed pellets to at least less than 3.5% by weight, especially 3 or 2.5% or less. Otherwise, the brittle and "crackling" characteristic may not be obtained. The frying step should also puff the pellets to at least double the volume of the unpuffed pellets, and more preferably, at least triple the volume of the unpuffed pellets. This will ensure the light and friable characteristic associated with deep-fat fried pork skins.

By the addition of a proper coloring agent, either prior to, during or after the frying step, the fried pellets will have the color and texture of a puffed pork skin. With the addition of salt, i.e., up to 3% by weight, the correct flavor will be obtained. Thus, the total overall appearance, mouth feel and taste will be very similar to conventionally deep-fat fried pork skins, and the product may be accurately characterized as a reformed fried and puffed pork skin.

Flavoring may, however, be added at any step of the process, e.g., the moisturized particles may be treated with smoke, or smoked salt may be used in lieu of natural salt. If desired the smoke treatment may be carried out during the drying of the cut pellets. Hot smoke at about 200° F. is acceptable in this regard.

Alternatively, flavoring agents may be added during the extruding step. This is particularly effective when the flavoring agent is added so that the flavoring agent is worked into the material during gelatinization thereof. A suitable extruder for carrying out this embodiment of the invention is disclosed in U.S. Pat. No. 2,915,957, which disclosure is incorporated herein by reference.

As noted above, the extrudate exiting the extruder will be a thermoplastic moldable mass. This mass will have viscous-elastic properties which will allow its formation into a shaped sustaining form, e.g., for forming a puffed pork skin or a decorative shape. To improve this viscous-elastic behavior, the moldable mass may be additionally worked after passing out of the extruder and prior to being extruded into a shape sustaining form. The additional working enhances the viscous-elastic properties and achieves better molding properties. Any sort of mechanical working, e.g., on rolls, screws and the like may be used. The working will normally be at ambient conditions, although slightly elevated temperatures, e.g., up to 150° F., may be used is desired.

The thermoplastic moldable mass may be directly molded into a decorative shape. Alternatively, the pellets produced by cooling and cutting, as described above, may be used as molding pellets in the conventional manner, i.e., pellets may be feed to a conventional shape forming extruder or injection molding machine in the same manner as a plastic pellet for such purposes. Extruding or molding temperatures between 250° F. and 325° F. are acceptable and will, largely, avoid puffing of the product. The decorative shape may take any form desired. As an example, the moldable composition may be compression molded or injection molded into the shape of a dog bone. This will provide a dog snack food which is relatively horny and will provide both excellent chewing exercise for the dog (including the cleaning of the teeth) as well as a high protein content snack. Similar molding can take place for other animals. Additionally, a novelty shape may be molded and subsequently puffed for human consumption. Thus, shapes of the suits of playing cards, e.g., clubs, diamonds, spades, and hearts, may be molded and puffed for a novelty snack food. Animals and comic shapes may be molded and puffed for novelty juvenile snack foods. Other similar moldings and shapings will be readily apparent to those skilled in the art.

Irrespective of the subsequent processing, the composition which exits the extruder is a puffable thermoplastic composition in a shape sustaining form (when cooled). The composition is at least partially gelatinized particles of animal parts, the moisture content thereof being less than 15%, the fat content thereof being less than 15%, and the protein thereof being substantially undenatured. In this regard, the term "substantially undenatured" means that the protein has not been subjected to such temperatures and/or conditions (e.g., hot oil) which will prevent gelatinization to the thermoplastic mass, as defined above. The thermoplastic mass, as noted above, may be shaped into a form suitable for puffing to simulate the natural puffed pork skin, e.g., will have a puffed volume at least twice the unpuffed volume. Alternatively, the composition may be in a shaped sustaining form which is a decorative thermo-formed shape. In this regard, the term "thermo-formed" means that it is moldable in the thermoplastic state by conventional thermoplastic molding and extruding techniques.

The product of the present invention has several important improvements over products of the prior art, including the products of the aforenoted copending application. The products of the copending application require, at least in part, rendered animal parts, and as noted above, this inherently causes protein denaturization, which in turn does not allow for the subsequent ease of the greater gelatinization of the present invention. Hence, the puffed products of the copending application have a darker color than the present products; the present products have more uniform puff cell size and cell distribution; the present products have a more uniform texture and mouth feel; when masticated or broken the present products break into more discrete parts and with less very small parts or "fines"; and the inability for full gelationization of the products from the rendered parts causes some hard sections in the products of the copending application, while that problem does not occur in the present products. Thus, the present products are almost indistinguishable from the natural fried pork skins, while the products of the copending application were distinguishable. This is because the protein of the pellets to be puffed in the present invention is from mechanically rendered animal parts and, hence, substantially undenatured. In the specification, the term consisting essentially of mechanically rendered parts, is defined as not being hot oil rendered to the extent defined above.

As noted above, the product may be colored with food-grade colors, and flavored with food-grade flavors. Additionally, the product may contain preservatives such BHT, BHA and the like.

The invention will be illustrated by the following examples, where all parts and percentages are by weight, as is the case in the foregoing specification, unless otherwise designated. However, the invention is not limited to the specific examples thereof, but is fully applicable to the scope of the foregoing disclosure.

EXAMPLE 1

Green pork skins are separated and inspected for blemishes and foreign matter. The green skins are passed through rotating discs knife blades where the skins are cut into strips of approximately 1 inch and in width. The strips are then feed back through the rotating discs knives at a 90° angle to produce pellets which are approximately 1 inch by 1 inch.

The pellets are feed to an oven-type tumbling dryer where hot air and hickory smoke dry the pellets at temperatures of about 250° F. until the moisture content is reduced to about 20%, e.g., for approximately 1 to 3 hours. During this drying process, a cure composition of sugar/salt, along with certain spices such as pepper and the like, are added in the dryer.

The dried pellets are ground in an Urschel Comitrol grinder using a 3-K-030-300-U blade and head combination. The ground particle size is such that the particles have no dimension greater than 3/16 inch. The average particle size is between about 1/16 and 1/8 inch.

The particles are placed in a Dacron centrifuge bag and centrifuged in a Bock basket-type centrifuge which at full RPM generates approximately 850 g's on the ground particles. This centrifugation causes expelling of fat from the particles and the centrifugation is continued until the fat content reaches approximately 12% to 13%.

The defatted animal parts have somewhat agglomerated in the centrifuge and after cutting with knives, grinding is again performed in the Urschel Comitrol for convenience in comminuting the agglomerated defatted particles for feeding to the extruder.

A portion of the defatted particles is fed to the throat of a screw-type extruder (manufactured by the Bonnet Company) where the throat section is maintained at a temperature of less than 100° F. The second section is maintained at a temperature between 260° F. and 280° F. (primarily at 272° F.), the third section is maintained between 230° F. and 245° F. (primarily at 240° F.), and the last section is maintained at 135° F. to 165° F. (primarily at 145° F.). The die is unheated and the product exits the extruder at approximately 220° F. The extrudate passes through pinched rollers traveling at peripherial speeds so as to accomplish a stretch ratio of approximately 2:1. The stretch renders the extrudate more uniform in cross-section.

After stretching, the extrudate passes through a series of rollers within an enclosure where cooled air is circulated. The extrudate is cooled sufficiently that cutting may be accomplished with ease, i.e., below 120° F. To avoid condensation of moisture on the rollers, the cooled air is dehumidified prior to passing into the enclosure.

The cutting of the cooled extrudate produces pellets approximately 1 inch by 1 inch. The cutting of the extrudate is slightly greater than 1 inch in length in order to accommodate the slight retraction of the extrudate after it is cut (the thermoplastic mass has a slight elastic memory induced by the stretching).

The cut pellets are tumbled to keep the pellets from agglomerating and ambient air is passed through the tumbler during this period. The purpose of the tumbling is simply to accumulate the pellets for subsequent processing.

The pellets are then passed to a hot oil dryer maintained at about 225° F. and dried until the moisture content is reduced to approximately 10%.

After the pellets have been dried, they are allowed to equilibrate for about 6 hours to insure that the moisture content is substantially uniform throughout the pellet.

A portion of the pellets is placed in conventional plastic lined kraft paper bags and stored for shelf-stability testing. Another portion of the pellets is placed in hot oil maintained at a temperature of 400° F. and puffed to an expansion such that the puffed volume is three times the unpuffed volume. The product is tender, of good mouth feel and taste, has no hard centers and is uniform in size, shape and texture.

EXAMPLE 2

The procedure of Example 1 was repeated, except that in lieu of a screw-type extruder, a grinding-type extruder was used (manufactured by the Adams Company), and a lower moisture content was reached and then adjusted to 12% by lightly spraying the defatted particles with water. The extruder was operated at 140 rpm with the die face and the die section preheated to 300° F. The extruder was fed at a rate of 1 pound, 9 ounces per minute and the extrudate was cut without stretching at the die face with a revolving knife. After cutting the extrudate slightly puffs, but shrinks back and becomes relatively hard and horny after cooling.

The extrudate is then puffed in the hot bath according to the procedure of Example 1. The product which results is essentially the same as that of Example 1.

EXAMPLE 3

The procedure of Example 2 was repeated, except that the die of the extruder formed an annular shape. The revolving knife, therefore, cuts the extrudate into rings of approximately ½ inch in diameter and ¼ inch thick. After puffing, a snack food was produced which had a dimension of approximately 1¼ inch in diameter and ¾ inch in thickness. The taste, texture, mouth feel and color appearance were essentially the same as that of Example 2.

EXAMPLE 4

The procedure of Example 2 was repeated, except that the die of the grinding-type extruder produced a continuous cylinder of approximately ¾ inches. As the hot moldable thermoplastic mass exited the extruder it was cut at intervals of approximately 6 inches. The mid-section of the so produced cylinder was flatten by pressing and after cooling produced a molded decorative shape having the appearance of a dog bone. The dog bone provided a hard but chewable snack food for test dogs and was well received by the test dogs.

What is claimed is:

1. A method for producing a puffable, thermoplastic composition derived from animal parts comprising:
   (1) drying substantially raw animal parts which contain no more than 25% hot oil rendered parts to moisture contents between 10% and 25%;
   (2) comminuting the dried parts to particles having dimensions no greater than ¼ inch;
   (3) mechanically defatting the comminuted particles at temperatures below 200° F. to an average fat content of less than 18% whereby protein contained in the particles is not substantially denatured and wherein mechanical means are used for said defatting;
   (4) macerating the defated particles in an extruder barrel at temperatures between 250° F. and 330° F. and under sufficient pressure to cause mastication and gelatinization of the particles and to form a thermoplastic moldable mass;
   (5) extruding the moldable mass into a shape sustaining extruded form;
   (6) cooling the extruded from to below 215° F.; and
   (7) cutting the cooled form into puffable pellets.

2. The method of claim 1 where the pellets are puffed in hot oil to at least twice the unpuffed volume of the pellets.

3. The method of claim 1 wherein dried parts are cooled to below at least 150° F. prior to comminuting.

4. The method of claim 1 wherein during the extrusion step the defatted particles are subjected to temperatures below 300° F.

5. The method of claim 1 wherein the mechanical defatting is by centrifugation.

6. The method of claim 1 wherein prior to or after the mechanical defatting the particles are adjusted to moisture contents between 12% and 22%.

7. The method of claim 1 wherein the mechanical defatting produces particles with fat contents below 15%.

8. The method of claim 7 wherein the fat content is below 15% and the particles have moisture contents between 18% and 24% and the maceration and extrusion takes place in a high pressure screw-type extruder.

9. The method of claim 7 wherein the fat content is below 15% and the particles have moisture contents between 12 and 15% and the maceration and extrusion is in a low pressure grinding-type extruder.

10. The method of claim 1 wherein the extruded form is stretched at ratios of at least 2:1.

11. The method of claim 10 wherein the stretching is prior to completing the cooling step.

12. The method of claim 2 wherein pellets are equilibrated for at least 0.5 hour prior to puffing.

13. The method of claim 2 wherein the temperature of the hot oil is between 325° F. and 410° F.

14. The method of claim 13 wherein the pellets, prior to puffing, are dried below 300° F. and until the moisture content thereof is below 15%.

15. The method of claim 14 wherein the pellets are dried in hot oil or hot air while being agitated.

16. The method of claim 15 wherein the pellets are dried in hot air while being tumbled.

17. The method of claim 1 wherein the raw animal parts are dried in at least one of hot air and smoke.

18. The method of claim 17 wherein the moisture content of the dried animal parts is between 12% and 24%.

19. The method of claim 17 wherein the drying temperature does not exceed 300° F.

20. The method of claim 1 wherein the comminuting is by grinding to particles having dimensions no greater than 1/16 inch.

21. The method of claim 20 wherein the particle dimensions are no greater than 1/64 inch and the ground particles include ground bone of said dimensions.

22. The method of claim 5 wherein defatting is by a basket-type centrifuge.

23. The method of claim 1 wherein the moldable mass is additionally mechanically worked after passing out of the extruder and prior to being extruded to a shape sustaining form.

24. The method of claim 1 wherein the pellets are thermo-formed into a decorative shape.

25. The method of claim 24 wherein the decorative shape in puffed.

* * * * *